United States Patent [19]

Prast et al.

[11] Patent Number: 5,176,731
[45] Date of Patent: Jan. 5, 1993

[54] DEVICE FOR PERFORMING MEASUREMENTS ON A TRANSPARENT OBJECT, METHOD OF MANUFACTURING A FIBER AND FIBER MANUFACTURED BY MEANS OF SAID METHOD

[75] Inventors: Gijsbert Prast; Cornelis M. G. Jochem, both of Eindhoven, Netherlands

[73] Assignee: U.S. Philips Corp., New York, N.Y.

[21] Appl. No.: 799,698

[22] Filed: Nov. 25, 1991

Related U.S. Application Data

[63] Continuation of Ser. No. 607,780, Oct. 25, 1990, abandoned, which is a continuation of Ser. No. 491,573, Jun. 12, 1989, abandoned, which is a continuation of Ser. No. 115,317, Nov. 2, 1987, abandoned.

[30] Foreign Application Priority Data

Jun. 10, 1987 [NL] Netherlands ............... 8701346

[51] Int. Cl.⁵ ............... C03B 37/025; C03B 37/07
[52] U.S. Cl. ............... 65/11.1; 65/3.11; 65/13; 65/29; 65/158; 65/160; 65/DIG. 13; 356/73.1; 356/385
[58] Field of Search ............... 65/2, 3.11, 3.4, 17, 65/29, 157, 158, 160, 163, DIG. 13; 356/384, 73.1, 385

[56] References Cited

U.S. PATENT DOCUMENTS

| | | | |
|---|---|---|---|
| 3,719,425 | 3/1973 | Leitz | 356/384 |
| 3,879,128 | 4/1975 | Presby | 356/111 |
| 4,021,217 | 5/1977 | Bondybey et al. | 65/158 |
| 4,027,977 | 6/1977 | Frazee | 427/163 |
| 4,081,258 | 3/1978 | Goell et al. | 65/29 |
| 4,102,661 | 7/1978 | Dudderar et al. | 65/29 |
| 4,323,938 | 6/1985 | Grego | 65/29 |
| 4,363,827 | 12/1982 | Eichenbaum | 65/29 |
| 4,409,263 | 10/1983 | Aloisio | 65/3.11 |
| 4,501,492 | 2/1985 | Douklias | 65/29 |
| 4,541,856 | 9/1985 | Maillard et al. | 65/158 |
| 4,553,217 | 11/1985 | Daudt | 356/384 |
| 4,602,926 | 7/1986 | Harrison | 65/29 |
| 4,638,168 | 1/1987 | Marino | 356/73.1 |
| 4,650,322 | 3/1987 | Fejer | 356/73.1 |
| 4,660,972 | 4/1987 | Rossberg | 356/73.1 |
| 4,779,978 | 10/1988 | Hatton | 356/73.1 |
| 4,882,497 | 11/1989 | Inoue | 356/73.1 |

FOREIGN PATENT DOCUMENTS 56-111406 9/1981 Japan.

*Primary Examiner*—Robert L. Lindsay
*Attorney, Agent, or Firm*—William L. Botjer

[57] ABSTRACT

In a device for performing measurements on at least partly transparent objects such as optical fibres a radiation beam is directed on the object. The radiation deflected by the object is imaged by means of a lens system (321, 322) on a radiation-sensitive detection system (330). As a result of refraction on interfaces between areas having a different refractive index (311, 312) in the object and between the object and the surroundings (315), dark or light bands corresponding to the projection of the interfaces are produced on the radiation-sensitive detection system (330). Thus measurements can be performed on the internal structure of the object.

10 Claims, 7 Drawing Sheets

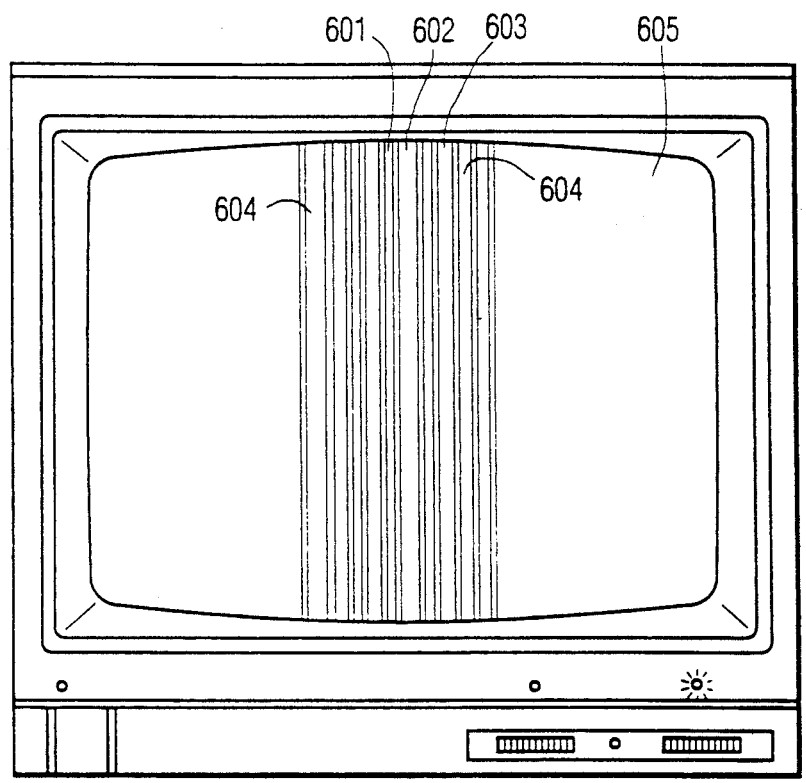
FIG. 6
FIG. 7
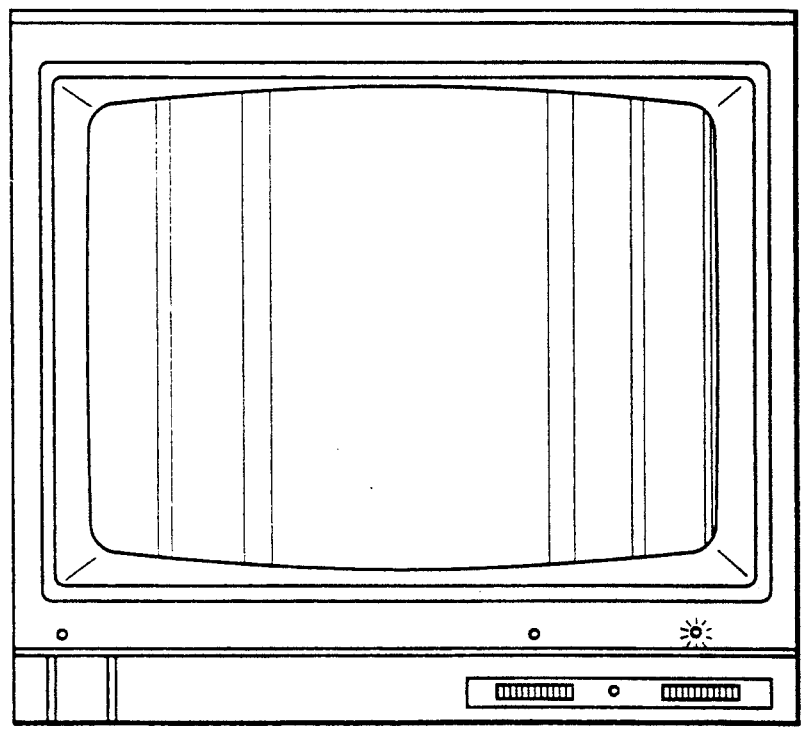

DEVICE FOR PERFORMING MEASUREMENTS ON A TRANSPARENT OBJECT, METHOD OF MANUFACTURING A FIBER AND FIBER MANUFACTURED BY MEANS OF SAID METHOD

This is a continuation application Ser. No. 07/607,780 filed Oct. 25, 1990, which is a continuation of application Ser. No. 07/491.573 filed Jun. 12, 1989, which is a continuation of application Ser. No. 07/115,317 filed Nov. 2, 1987, all now abandoned.

BACKGROUND OF THE INVENTION

The invention relates to a device for performing measurements on an object comprising a core and at least one transparent layer surrounding it, said device comprising a measuring space for accommodating the part of the object to be measured, at least one radiation source unit for supplying a radiation beam with which the object is irradiated and a radiation-sensitive detection system for detecting radiation from the measuring space. The invention also relates to a method of manufacturing a fibre and to a fibre manufactured by means of such a method.

SUMMARY OF THE INVENTION

A device for performing measurements on a transparent body consisting of layers or shells is of special importance when manufacturing optical fibres for telecommunication purposes. Such a fibre comprises a core and a cladding of, for example, glass which is surrounded by a protective synthetic material coating. The protective synthetic material coating is often composed of two layers, with a relatively soft material being chosen for the inner layer. The diameter of the core and the thickness of the cladding which may consist of a plurality of layers having mutually different refractive indices, codetermine the optical transmission properties of the fibre. Fluctuations in the core diameter and the layer thicknesses have a negative influence on the optical quality of the fibre. Particularly for so-called single-mode fibres, with a core diameter of between approximately $8/\mu m$ and approximately $10/\mu m$, it is important that the dimensions only slightly deviate from the desired values.

The mechanical load to which an optical fibre is subjected also influences the optical properties of the fibre. One of the sources of mechanical load is the difference between the thermal coefficients of expansion of glass and synthetic material. Allowance must be made for the fact that an optical fibre may be exposed to considerable temperature differences, and in practice ambient temperatures of $-60°$ C. to $+80°$ C. are possible. The composition of the coating and particularly the thickness and the E-modulus of the soft coating layer directly contiguous to the cladding determine the influence of the mechanical load on the optical properties of the fibre. A method in which the coating can be provided in an accurately concentrical manner, also in the case of a small layer thickness, is therefore important for obtaining an isotropic mechanical load of the fibre and hence for preventing warping.

A measuring device as described in the opening paragraph and a method of manufacturing an optical fibre in which this measuring device is used for concentrically coating this fibre are known from U.S. Pat. No. 4,363,827. In the known device a coated optical fibre is placed in a narrow radiation beam emitted by a laser. The radiation is refracted and/or reflected in the fibre on the interfaces between the layers having different refractive indices and is spread in a wide angular range. The angular distribution of the radiation intensity is determined by the structure of the refractive index profile in the fibre.

In the known device and in the known method the symmetry of the angular distribution of the radiation intensity is used to monitor the concentricity of the coating with respect to the core and cladding and, if necessary, to readjust the coating device. The known device and method are, however, unsuitable if the layers are thin. It has been found that for layers having a thickness of less than approximately $20/\mu m$ it is impossible or hardly possible to derive sufficiently accurate information from the scattering pattern.

Although methods are known, for example, from U.S. Pat. Nos. 3,879,128 and 4,027,977 to derive given fibre parameters from the angular distribution of the radiation intensity in fibres having a simple structure, it has hitherto been found impossible to monitor these parameters so rapidly and accurately that the equipment can be re-adjusted during manufacture of the fibre after comparison with the desired values. Thereby provides this possibility an additional advantage in the sense that the part of the fibre deviating from these parameters beyond the permitted tolerances can be identified and subsequently excluded from further operations, this achieving a considerable cost-saving.

It is an object of the invention to provide a device for performing measurements on an object composed of layers, at least the outer layer of which is transparent, with which device the constancy of a number of parameters relating to the internal structure of the object can be monitored rapidly.

To this end the device according to the invention is characterized in that an objective system for imaging a plane located in the measuring space on the radiation-sensitive detection system is arranged between the measuring space and the radiation-sensitive detection system, said objective system having a limited range of acceptance. The invention is based on the recognition that a curved interface between two materials having a different refractive indices refracts and/or reflects an incident radiation beam, whose direction is mainly parallel to a tangent with the interface, in such a manner that the refracted and/or reflected radiation leaves the object at an angle which, in addition to the difference in the refractice indices, depends on the distance between the incident radiation beam and the tangent with the curved interface. If the range of acceptance of the objective system is chosen to be such that only that part of the refracted and/or reflected radiation is accepted which leaves the object within a given angular range, radiation is substantially exclusively incident on the radiation-sensitive detection system at those areas which correspond to the relevant angular range. Thus a pattern of light and dark bands directly comprising information about the internal structure of the transparent part of the object is produced on the detection surface.

If measurements are to be performed on the transparent outer layer or layers of the object, which is for example the case when the concentricity of the outer layer is monitored, it is necessary that radiation which is deflected by the object only in this outer layer or layers reaches the radiation-sensitive detection system via the objective system. The radiation traversing the outer layer must thus not be deflected too strongly. To this end the device according to the invention is further characterized in that it is provided with means to fill the measuring space with a transparent substance whose refractive index differs from the refractive index of the transparent outer layer of the object, said difference being at most approximately equal to the radius of curvature of the outer side of the object divided by the distance between the plane and the objective system. Since the radiation traversing the layer substantially on the outer edge is strongly deflected and the radiation traversing the centre of the layer is only deflected to a slight extent due to the small difference in refractive index, an observable pattern which is rich in contrast and which indicates the position of the outer side is produced on the radiation-sensitive detection system.

An embodiment of a device according to the invention is characterized in that the radiation source unit supplies a radiation beam which at the location of the object has a cross-section which is larger than the part of the object to be measured. By a broad radiation beam a clear background is obtained against which the structure of the object is contrasted.

The device according to the invention may be further characterized in that the radiation beam traversing the object is substantially parallel. A parallel radiation beam supplies the maximum contrast and the minimum distortion in the imaged pattern.

The device according to the invention is preferably characterized in that the radiation source unit and the objective are placed on either side of the measuring space. The object is then observed in transmission, which provides the advantage that the image obtained can be easily interpreted, whilst the dark bands approximately coincide with the cross-sections of the interfaces and the plane.

A preferred embodiment of the device according to the invention may be further characterized in that the principal axis of the radiation beam and the optical axis of the objective system extend at an angle to each other. Consequently those parts of the object from which radiation emerges which is deflected by approximately the said angle are imaged as light bands on the radiation-sensitive detection system, whereas the rest of the image remains dark. When suitably choosing the angle, the light bands substantially correspond to the interfaces between layers having different refractive indices. For a full image of the object two radiation beams are to be used which should be arranged symmetrically with respect to the optical axis of the objective system. Since light bands in an otherwise dark image can be better recognized with automatic means than dark bands in a light image, this embodiment makes it simpler to realize an automatic measuring or monitoring device in accordance with the principle of the invention.

In order to make small structures in the object clearly visible, the device according to the invention may be characterized in that the objective system produces a magnified image of the said plane in the radiation-sensitive detection system.

An embodiment of a device according to the invention is further characterized in that the objective system comprises a first sub-system having a first focal length and a second sub-system having a second focal length, the first sub-system being movable and the second sub-system being placed at a distance from the radiation-sensitive detection system, which distance is equal to the second focal length. Focusing on the plane only requires a movement of the first sub-system and the magnification factor is not changed during focusing.

A preferred embodiment of the device according to the invention is characterized in that it comprises a plurality of objective systems and an equal plurality of radiation-sensitive detection systems, the optical axes of the objective systems extending at an angle to one another. Consequently the object can be observed in more directions so that information about the structure of the object in different directions is simultaneously available.

The invention also relates to a method of manufacturing an optical fibre comprising a core and a cladding surrounding it, in which firstly a preform is heated and is drawn at a given drawing speed to a fibre under the influence of a tensile force. A preform is herein understood to mean the starting material suitably formed for drawing the fibre. This may be, for example, a solid rod with a core and a cladding portion, which rod has the desired refractive index profile, or a rod for the core or for the core and a portion of the cladding and a cylinder substantially coaxially surrounding it for the remaining part of the cladding, with a gap being present between the rod and the cylinder. When using a separate cladding portion it is joined with the core portion during drawing.

The method according to the invention is characterized in that the value of the drawing speed is controlled by means of a signal which is representative of the diameter of the core and which is supplied by a device according to the invention and as described hereinbefore. By feedback to the drawing speed the diameter of the core can be maintained constant with an accuracy which is better than $0.2/\mu m$ by means of the device described above.

Furthermore the device may also be used, for example to simultaneously check the core diameter and the outer diameter of the cladding so that a deviation of one of the diameters beyond the required tolerance can be detected and registered and the relevant part of the fibre can be excluded from further operations at a later stage. This situation may occur, for example, at the beginning or the end of a preform or at the transition from one preform to a subsequent preform.

The method according to the invention can also be used for manufacturing an optical fibre comprising a core and a surrounding cladding having a given refractive index profile in which firstly a preform is heated and is drawn at a drawing speed to a fibre under the influence of a tensile force. The method according to the invention is characterized in that the value of the said drawing speed is controlled by means of a signal which is representative of the thickness of diameter of a layer in the cladding having a given refractive index, and which is supplied by a device according to the invention and as described hereinbefore. The measurement may relate to both the diameter of the cylinder having a given refractive index and to the thickness of the layer itself.

The method according to the invention can also be used for manufacturing a fibre coated with a coating material, which fibre is passed at least once through a bath containing a curable liquid coating material and is subsequently passed through an outlet opening in a nozzle, the position of the fibre with respect to the outlet opening being controlled by means of a control signal which is representative of the concentricity of the fibre and the coating material provided thereon. In the method according to the invention the control signal is supplied by a device according to the invention and as described hereinbefore.

The fibre to be coated does not need to have a transparent core. The method according to the invention can be used successfully when coating an opaque wire, for example, when providing an electrically insulating coating around copper winding wire. For successfully using the invention the coating should of course consist of a transparent material. The winding wire used in practice usually has a diameter which varies between $20/\mu m$ and $1250/\mu m$. An electrically insulating coating is provided around this wire, which coating consists of a layer having a thickness increasing from $4/\mu m$ for a wire having a diameter of $20/\mu m$ to $60/\mu m$ for a wire having a diameter of $1250/\mu m$. In view of the relatively small thickness of the coating it is absolutely required for the coating of this fibre type to be provided satisfactorily concentrically.

The inventive methods of manufacturing a fibre are preferably characterized in that measurements are performed on a portion of the fibre which is present in a bath containing a liquid coating material. As already stated the difference of the refractive indices between the outer layer of the fibre to be measured and the surroundings of the fibre must be kept limited. The bath containing liquid coating material through which the fibre is passed constitutes an environment which is eminently suitable for this purpose. This provides the great advantage that the fibre cannot get into contact with an arbitrary medium which might leave traces between the coatings and would thus adversely affect the quality of the fibre.

Finally, the invention also relates to a fibre manufactured by means of the method described hereinbefore.

A fibre according to the invention is characterized in that the difference between the maximum deviation and the average value of the core diameter or the diameter of a layer provided in the cladding with a deviating refractive index is not more than approximately 2% of the diameter. It has been found that an accuracy of approximately 2% of the diameter is achievable.

A fibre according to the invention may also be characterized in that it is surrounded by at least one coating whose eccentricity is less than $0.5/\mu m$.

BRIEF DESCRIPTION OF THE DRAWINGS

The invention will now be described in greater detail by way of example with reference to the accompanying drawings in which

FIGS. 6 and 7 show reproductions of images of optical fibres obtained by means of devices as shown in FIGS. 4 and 5, respectively, FIG. 9 shows a part of a device for manufacturing an optical fibre using the method according to the invention and FIG. 10 shows an example of an optical fibre according to the invention.

DETAILED DESCRIPTION OF THE PREFERRED EMBODIMENTS

Figure 1A:
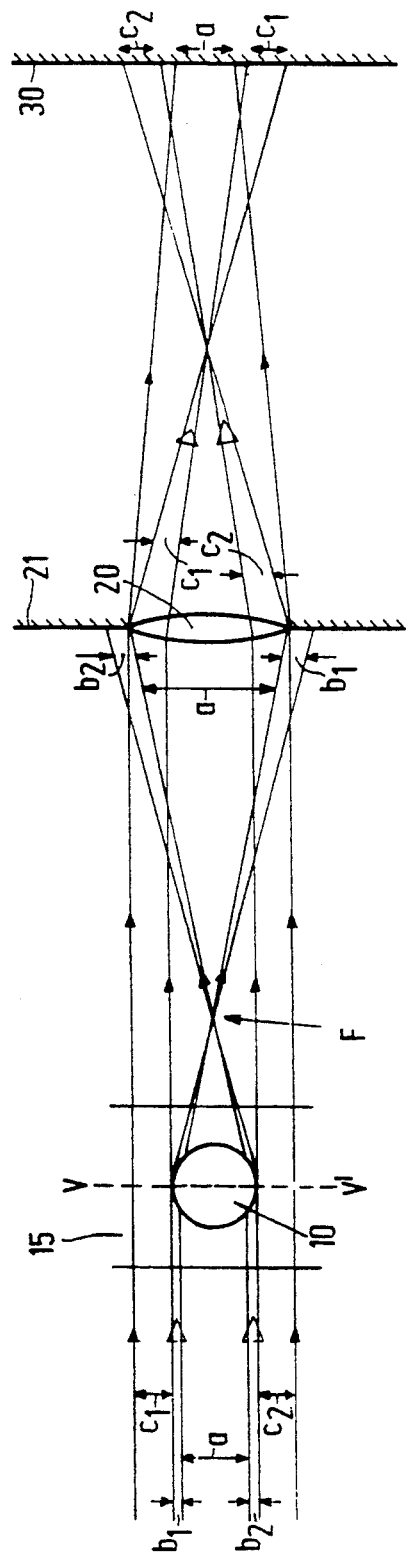
FIGS. 1a and 1b show diagrammatically the principle of the invention.
Figure 1B:
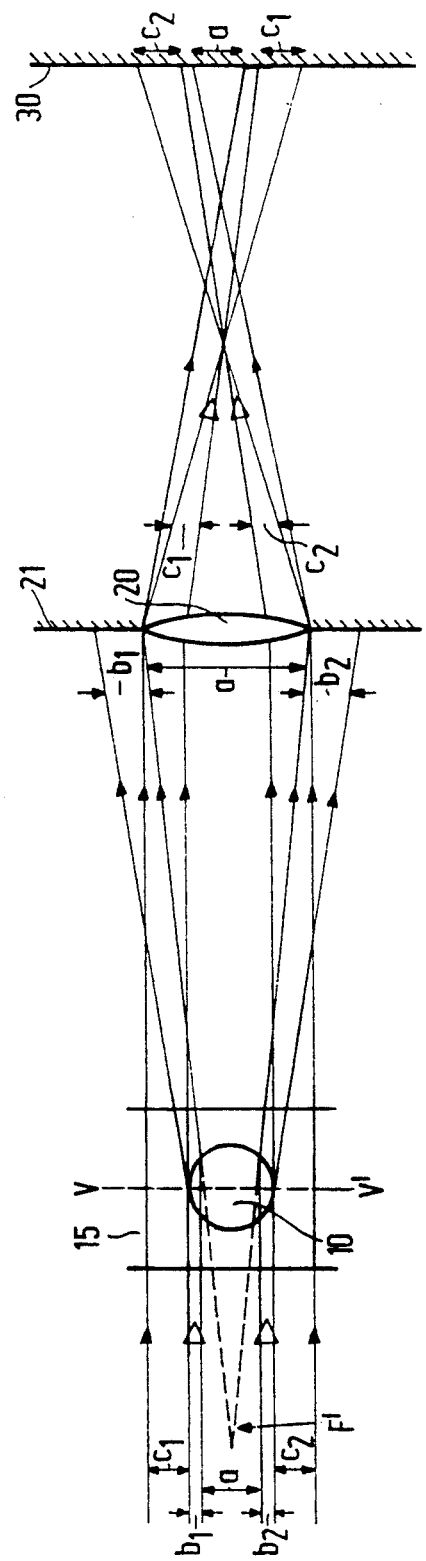

FIG. 1a shows diagrammatically the principle of the invention for performing measurements on a transparent object whose refractive index is larger than the refractive index of the surrounding material. FIG. 1b shows the operation in accordance with the same principle, but in this case for a transparent object whose refractive index is smaller than that of the surroundings. In both Figures the reference numeral 10 denotes a circular or cylindrical object having a uniform refractive index, the reference numeral 20 denotes an objective system shown as a single lens and the reference numeral 30 shows an image plane or screen. In a practical embodiment the reference numeral 30 denotes, for example the radiation-sensitive surface of a detector. The object 10 is placed in surroundings 15 whose refractive index differs only to a slight extent from the refractive index of the object. Although FIGS. 1a and 1b show the object as a homogenous transparent object, it may have a core which has a refractive index different from that of the outer layer or which is opaque.

Only some representative rays are shown of the radiation beam which is incident from the left in the Figures. The relevant portion of the beam can be distinguished in three sectors. In the first place the peripheral sector whose radiation is not deflected by the object 10 but is accepted by the objective system 20, denoted by $c_1$ and $c_2$ in the Figures. Then the central sector, denoted by a, whose radiation traverses the object and is subsequently accepted by the objective system and finally the intermediate sector, denoted by $b_1$ and $b_2$, whose radiation is incident on the object 10 and is deflected thereby but is subsequently not accepted by the objective system 20. According to the invention the range of acceptance of the objective system, that is to say, the diameter of the pupil together with the distance between the objective system and the object, is chosen to be such that there is such a sector ($b_1$, $b_2$). The focal length of the objective system and the distance between the screen 30 and the system 20 are chosen to be such that a plane located substantially in the centre of the object and indicated by V-V' in the Figures is imaged on the screen.

The device operates as follows. The portion of the radiation beam incident on the object, hence radiation in the sectors a, $b_1$ and $b_2$ is deflected at the interfaces between the object and the surroundings. If the refractive index of the object is larger than the refractive index of the surroundings, the object will function as a positive lens, as is shown in FIG. 1a, and the deflection will converge the radiation to a focus area F located between the object 10 and the objective system 20. In the reverse situation, in which the object behaves as a negative lens, as is shown in FIG. 1b, the deflected radiation emerging from the object seemingly originates from the virtual focus area F' located on the side of the radiation source. The term focus area is used because the object is generally not a lens and consequently there is no well-defined focus. A portion of the radiation deflected by the object originating from the sectors $b_1$ and $b_2$ falls outside the pupil of the objective system and cannot reach the screen 30. This is shown in FIGS. 1a and 1b by means of a diaphragm 21 on which the radiation from these sectors is incident, which diaphragm encloses the lens 20 shown and whose aperture coincides with the pupil of the objective system. The portion of the radiation originating from the sector a is accepted by the objective system 20 and is projected on the screen 30.

The radiation originating from the peripheral sectors $c_1$ and $c_2$ of the radiation beam are projected by the objective system 20 in two side sectors on either side of the area on which the radiation from the sector a is projected. Consequently dark bands corresponding to the sectors $b_1$ and $b_2$ in the radiation beam are present between the lighter areas. Since the boundaries between the peripheral sectors $c_1$ and $c_2$ and the sectors $b_1$ and $b_2$ are tangent with the interface between the object 10 and its surroundings, the outer edge of the dark areas on the screen 30 is thus a measure of the dimension of the object 10.

The intensity pattern on the screen 30 may be considered as an image of the plane V-V' on the screen. Those parts of the plane V-V' from which radiation originates which has not been deflected by the object 10, or which has been deflected, but not as far as beyond the range of acceptance of the objective system are imaged as lighter areas. Parts of the plane V-V' from which radiation originates which has been deflected as far as beyond the range of acceptance of the objective system 20 are, however, imaged darkly on the screen. By suitable choice of the refractive index of the surroundings, namely with a little difference in refractive index relating to the object, it is achieved that the dark bands are narrow, which results in a clear reproduction of the interfaces of the object.

No allowance has been made above for the fact that there is reflection of radiation on the interface of the object 10. Due to this reflection radiation which originally comes from the sectors $b_1$ and $b_2$ or from the central sector a will intersect the plane V-V' imaged by the objective system 20 on the screen 30 in an area which lies within the peripheral sector $c_1$ or $c_2$. As far as this radiation is accepted by the objective system it will reach the screen in the side areas on which originally also radiation from $c_1$ and $c_2$ is projected. Reflection on the interface of the object 10 with its surroundings 15 thus only influences the light-dark pattern on the screen in so far as the intensity distribution in the side areas is concerned.

In addition to the above-described principal embodiment of the device according to the invention, other arrangements for limiting the range of acceptance of the objective system are alternatively feasible, in contrast to the limitation imposed by the outer edge of the pupil. Thus, it is alternatively possible to render the central portion of the objective system impervious to radiation and thereby accept radiation originating at a given angle from a given part of the object and thus to reproduce that part of the object darkly in the image in the detection plane.

The foregoing shows that the principle of the invention is based on the recognition that, if the angle at which radiation leaves the object and the location where radiation leaves the object are correlated to each other, this existing relationship is used to visualize a light-dark pattern on the screen. This principle can also be used if the object is not observed in transmission but in reflection.

Figure 2:
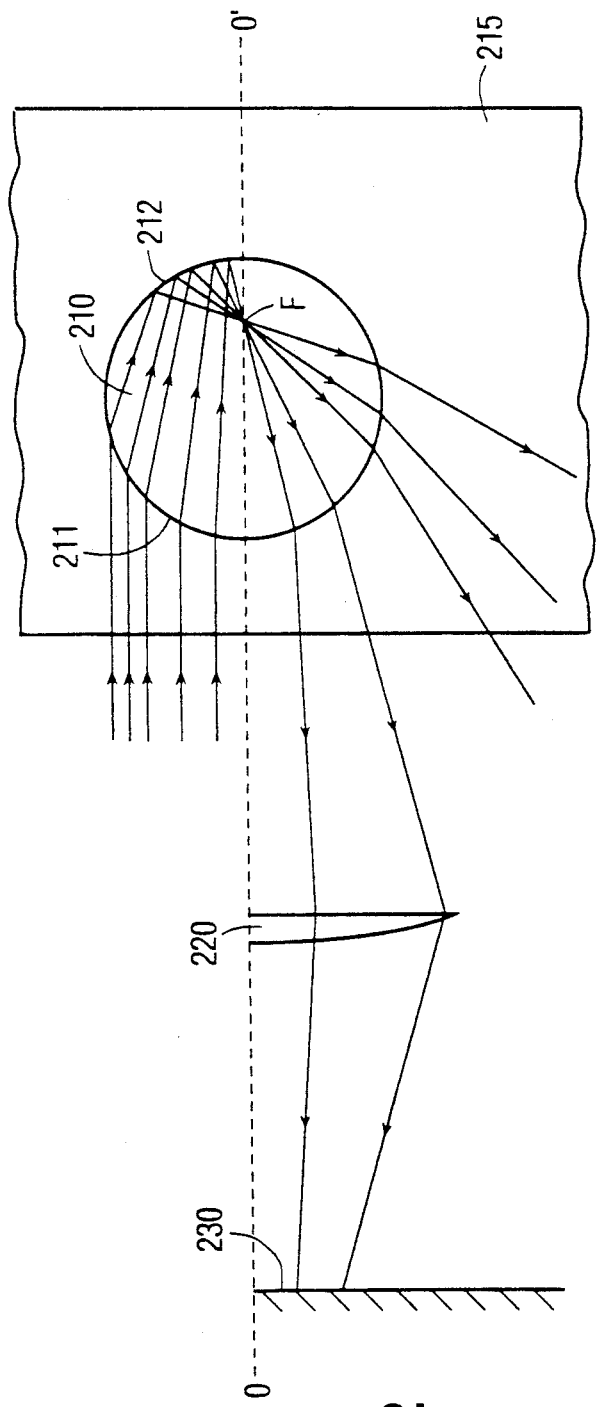
FIG. 2 shows the invention in the case of observing an object in reflection.

This possibility is shown diagrammatically in FIG. 2 for a circular or cylindrical object. To clarify the Figure only the portion above the O-O' axis of the incident radiation beam is shown and only the portion below said axis is shown for the reflected radiation.

An object 210 is placed in surroundings 215, with the refractive indices of the objects and the surroundings being different. A parallel beam of radiation incident on the object 210 is refracted on the front face 211 of the object and is reflected on the rear face 212. For the purpose of simplifying the Figure, it is incorrectly but for this argument unobjectionally assumed that the radiation reflected by the rear face is focused in a focal point F located on the optical axis 0—0' at the distance of less than half the radius of the circle or cylinder to the rear wall. The radiation reflected from the rear face 212 is refracted again on the front face 211 and leaves the object as a divergent beam. A portion of the beam can be projected on a screen 230 by means of an objective system 220. The intensity distribution on the screen, likewise as when observing in transmission, provides the possibility of drawing conclusions about the internal structure of the object.

However, since the angular deflection and the extent of reflection are not only dependent on the shape of the object but also on the refractive indices of the object 210 and of its surroundings 215, quantitative measurements in reflection require more a priori information about the object than such measurements in transmission. This method can be used for more qualitative measurements such as for determining the concentricity in an approximately rotationally symmetrical object composed of layers.

Figure 3:
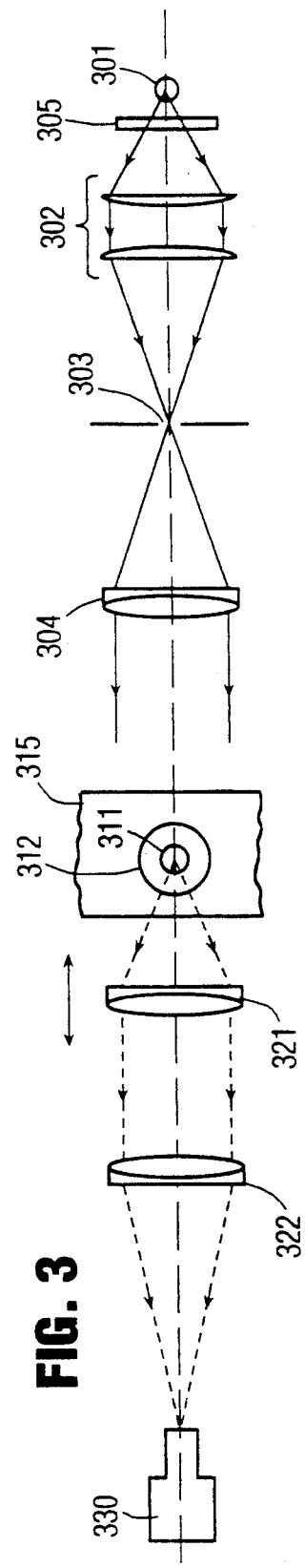
FIG. 3 shows diagrammatically an embodiment of the device according to the invention.

The device according to the invention is eminently suitable for performing measurements on an optical fibre. FIG. 3 shows a device which is suitable for this purpose. In this Figure the core and cladding of the fibre is denoted by the reference numeral 311 and the inner coating surrounding the core and cladding is denoted by 312. At the area of the measuring device the fibre is present in a measuring space filled with liquid 315. The Figure shows the radiation source unit to the right of the fibre, which unit comprises a radiation source 301, a collector lens system 302, a diaphragm 303 and a positive collimator lens 304. The liquid 315 with which the measuring space is filled may be, for example an UV-curing synthetic material which is used for the outer coating of the fibre. In that case further measures are to be taken in the radiation source unit to prevent UV-radiation from the radiation source 301 reaching the measuring space, for example, by placing an UV-filter 305 in the radiation path. The radiation source unit emits a parallel radiation beam to the measuring space accommodating the fibre 311 with its coating 312 in the liquid 315.

As described with reference to FIGS. 1a and 1b the objective system composed of the lenses 321 and 322 images a plane at the location of the fibre on a radiation-sensitive detection system 330. The radiation-sensitive detection system is, for example a television camera from which the objective is removed, a series of radiation-sensitive diodes or a single radiation-sensitive element with which the picture formed by the objective system 321-322 is scanned via a movable mirror.

The objective system 321-322 consists of, for example an achromatic lens 322 which has the radiation detector placed in its focal point and a movable achromatic lens 321 with which the object can be focused. This configuration renders it possible to focus without changing the magnification.

When performing measurements on optical fibres having diameters of approximately 100/μm to approximately 250/μ m a focal length of 40 mm for the lens 321 and of 600 mm for the lens 322, hence a magnification of 15, has led to satisfactory results.

Figure 4:
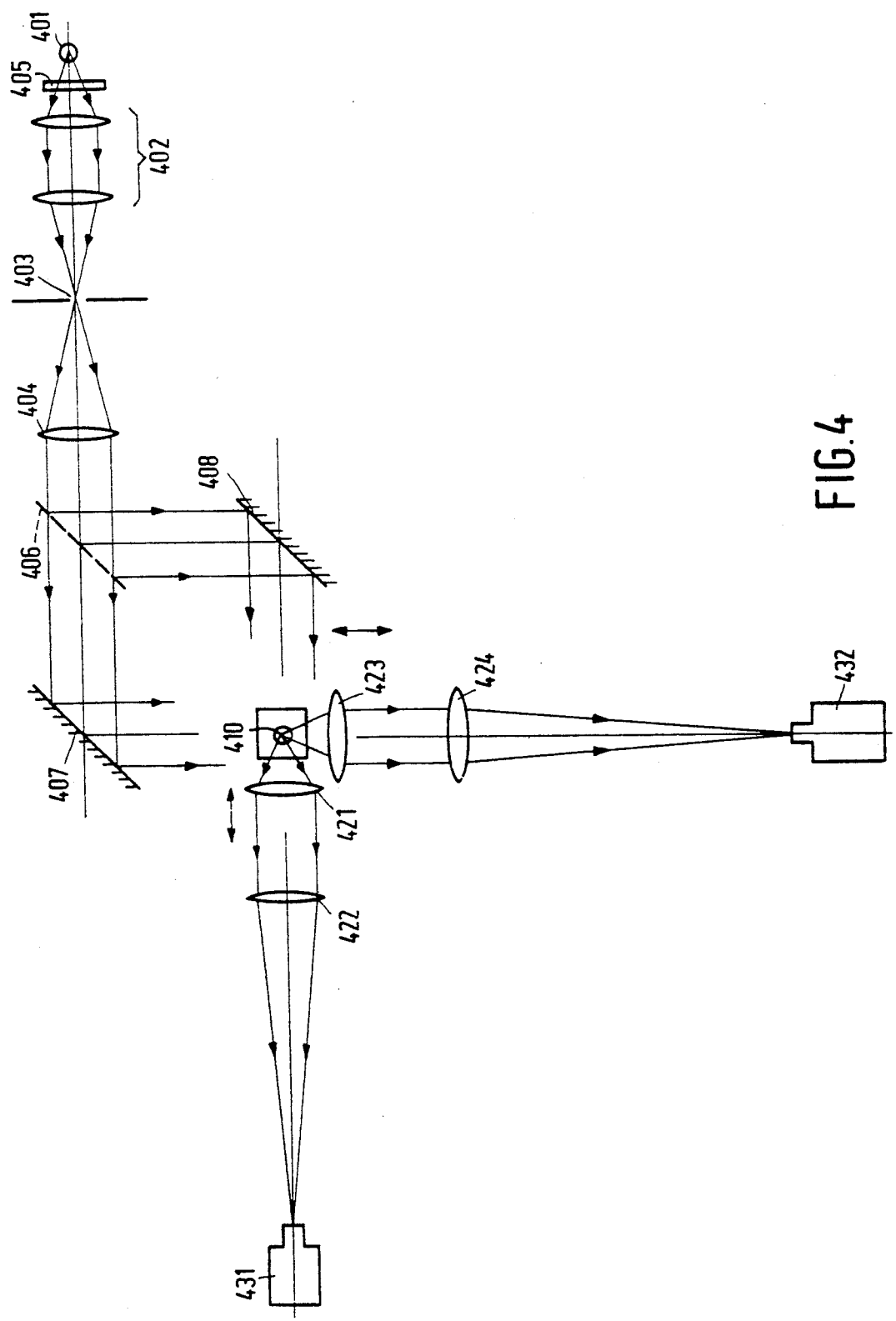
FIG. 4 shows diagrammatically an embodiment of the device suitable for use in the manufacture of an optical fibre on an industrial scale.

FIG. 4 shows an embodiment of the device which can be used in the manufacture of optical fibres on an industrial scale. The radiation source unit is identical to the radiation source unit described with reference to FIG. 3 and comprises a radiation source 401, a collector system 402, a diaphragm 403, a collimator lens 404 and a UV-filter 405. The radiation beam from the radiation source is split by the beam splitter 406, for example a semi-transparent mirror, in two sub-beams each being directed via a mirror 407 or 408 to the fibre 410. The sub-beams extend at right angles to each other at the area of the fibre 410. On the opposite sides objective systems 421–422 and 423–424 are provided which image the fibre 410 on the radiation-sensitive detection systems 431 and 432, respectively. The lenses 421 and 423 of the objective systems which are closest to the fibre can be moved in the direction of the arrows shown in the Figure. The radiation-sensitive detection systems are, for example, television or video cameras without an objective.

Figure 5:
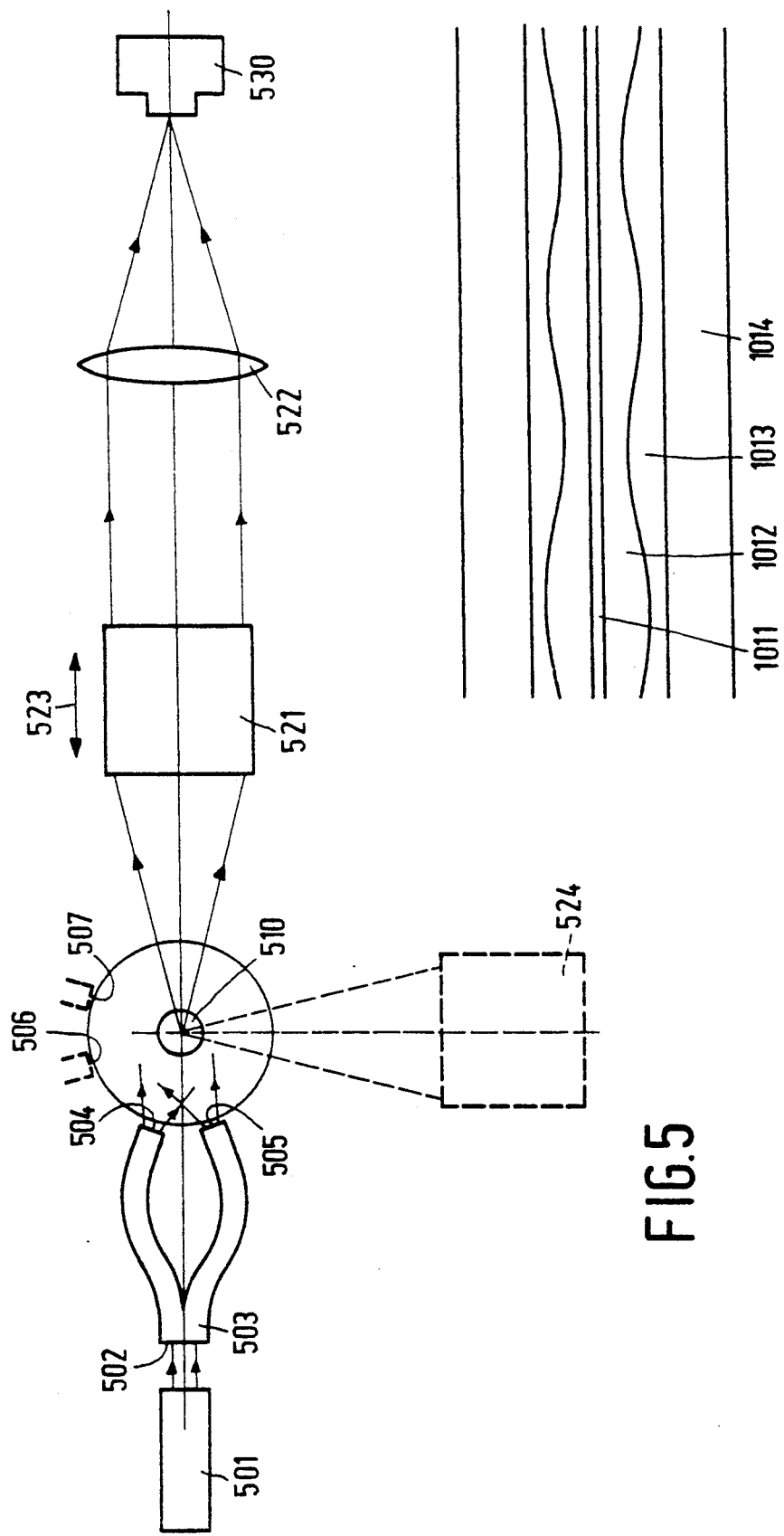
FIG. 5 shows diagrammatically a further embodiment of the device.

FIG. 5 shows a preferred embodiment of a measuring of monitoring device according to the invention. As a radiation source 501 a halogen lamp or a laser, for example a HeNe laser generating radiation at a wavelength of 632/μm is incorporated, or a semiconductor laser whose emitted radiation is in the infrared range. The laser irradiates the end face 502 of a beam of optical wave-guides 503. The beam of wave-guides is composed of two smaller beams whose other end faces 504 and 505 are placed on the edge of the measuring space through which the fibre 510 extends. To obtain an equal radiation distribution diffusors may be applied to the end faces 504 and 505. To reduce the effects of speckle noise from a laser, a rotating diffuser can be used, for example. A radiation beam with which the fibre is irradiated and whose principle axis extends to an angle to the objective system 521–522 placed behind the measuring space emerges from each of the two end faces 504 and 505. When suitably choosing these angles, the objective system only accepts the radiation deflected by the fibre which tranverses the fibre in close proximity of one of the interfaces between materials having different refractive indices. Thus the result is that the positions of the interfaces are indicated by a light band in the detection surface of the radiation-sensitive detection system 530. Such a light distribution is advantageous when automatically recognizing the positions of the interfaces.

The objective system shown comprises a microscope objective 521 a positive lens 522. The microscope objective 521 used has a magnification of 10 and a numerical aperture of 0.22. It is arranged movably with respect to the measuring space in the direction of the arrow 523 at a distance of approximately 16 mm. The positive lens 522 has a focal length which is between approximately 200 mm and approximately 300 mm and is located at a fixed distance from the radiation-sensitive detection system. The broken lines in FIG. 5 indicate the possible positions of the end faces 506 and 507 of a second set of optical wave-guides for irradiating the optical fibre in a direction transversely to the previously mentioned direction. The reference numeral 524 denotes the associated position of a microscope objective for imaging the fibre in the second direction on a second radiation-sensitive detection system which is not shown.

The configuration according to FIG. 5 can be extended by a radiation source which irradiates the fibre along the optical axis of the objective system so that, dependent on the radiation source which is switched on, the interface between areas in the fibre with different refractive indices appear on the radiation-sensitive detection system as light bands against a dark background or as dark bands against a light background.

FIG. 6 shows a reproduction of an imatge of an optical signle-mode fibre, obtioned by means of a device according to the invention, as is diagrammatically shown in FIG. 3 or 4. The Fig. is reproduced from a photographic image of a video monitor which is coupled to the video camera used as a radiation-sensitive detection system.

In the single-mode fibre a core 601 can be distinguished and a cladding which is composed of a portion 602 having a decreased refractive index and a portion 603 having a normal refractive index. The inner coating 604 surrounds the cladding. This coating is not arranged entirely concentrically and on the right-hand side of the photograph it is thicker than on the left-hand side. The volume 605 around the fibre is filled up with a liquid material for providing the outer coating.

This Figure shows that the difference in thickness of the coating to the left and right can be clearly recognized by means of the device according to the invention.

FIG. 7 shows a similar reproduction of an image obtained by means of an embodiment of the device as shown in FIG. 5. In this reproduction the interfaces between the inner coating and the cladding of the fibre and between the inner coating and the surrounding medium are visible as light bands.

Figure 8:
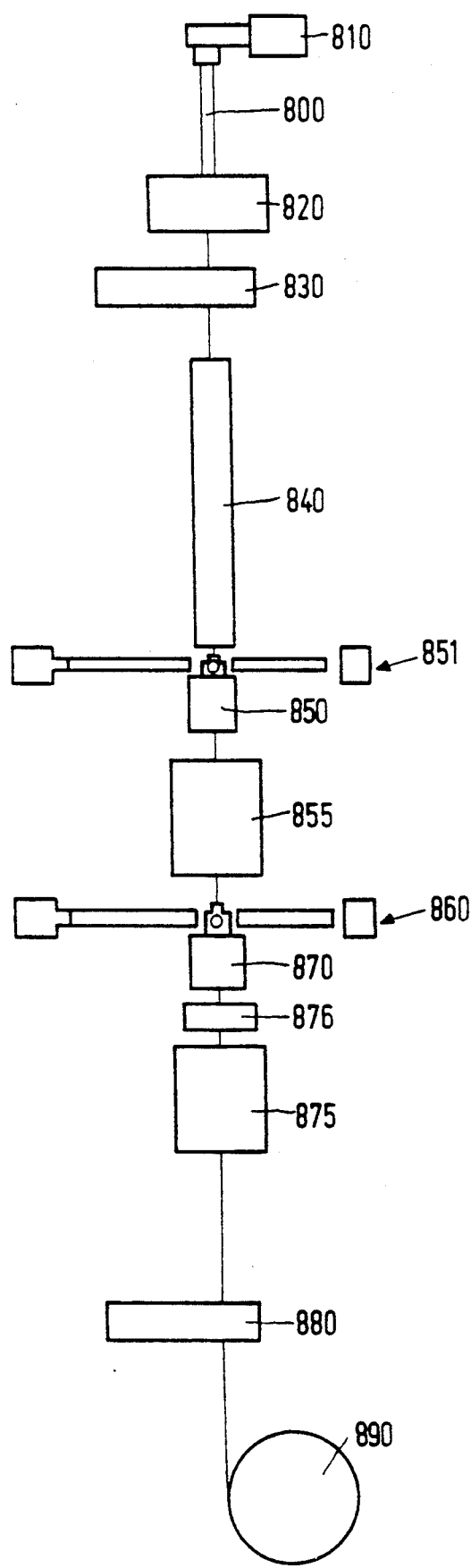
FIG. 8 shows diagrammatically a method of manufacturing an optical fibre.

FIG. 8 shows diagrammatically a possible method of manufacturing an optical fibre, in which method the invention can be used. A preform 800, for example a solid glass rod having a diameter of approximately 20 to 30 mm accommodating the refractive index profile desired for the fibre is passed into a furnace 820 by means of a feeder mechanism 810 and is heated in this furnace to such a high temperature that the material softens. The softened glass material is drawn to a fibre on the lower side of the furnace 820 and is passed through a cooling device 840. The preform may alternatively consist of a rod and one or more cylinders surrounding it, which rod and cylinders are connected together during drawing as is described, for example, in U.S. Pat. No. 4,602,926.

The diameter of the fibre is determined by means of a measuring instrument 830 and, based on this measurement, the drawing speed at which the fibre is drawn from the furnace 820 is readjusted.

The fibre subsequently traverses a bath 850 containing, for example UV or thermally curing liquid coating material for the soft inner coating and leaves the bath 850 with a coating of still fluid coating material surrounding it through the outlet opening of a nozzle. The bath containing the coating material may be accommodated in a reservoir of the so-called open-vessel type as described, for example in U.S. Pat. No. 4,409,263, but preferably the fibre is coated in a reservoir and in the manner as described in European Patent Application No. 0,200,256 because, even at higher speeds, no gas bubbles are included in the coating material. Subsequently the fibre is exposed to a treatment in the device 855 so that the coating material cures, for example by means of UV-radiation or heating. After the inner soft coating has been provided, the concentricity of the fibre and the coating is monitored by means of the device 860 and if it is found that the coating is not provided concentrically, the position of the fibre in the outlet opening of the nozzel of the bath 850 is re-adjusted. Subsequently the coating procedure is repeated to provide the hard outer coating by passing the fibre through the bath 870 which is also provided with a nozzle having an outlet opening and by exposing it to ultraviolet radiation or heat in the device 875. The concentricity of the outer coating with respect to the fibre is also measured by means of a device 876 and, if necessary, the position of the fibre in the outlet opening is re-adjusted.

Finally the outer diameter of the coated fibre is checked by means of a device 880 and the fibre is wound on a drum 890.

In the conventional manner of measuring the diameter of the uncoated fibre in the device 830 the outer diameter of the drawn fibre is determined. With regard to the core diameter it is assumed that the ratio in the preform between the diameter of the core and the outer diameter is constant and correct and also that the ratios between core diameter and outer diameter in the preform and in the drawn fibre are equal. Particularly the first-mentioned assumption is found to be not always correct in practice due to the manner in which the preform is manufactured. The result is that in the case of a constant outer diameter of the uncoated fibre the core diameter may vary, provided that it is considered over a distance of many kilometers.

According to one aspect of the method according to the invention of manufacturing an optical fibre the diameter of the uncoated fibre is checked by means of a device according to the invention for performing measurements on an object. It is then possible to directly check the core diameter so that a fibre can be obtained whose core diameter is substantially constant. If the preform is not perfect, the outer diameter of the uncoated fibre, considered over a distance of kilometers, may then vary to some extent. Also if the fibre has a complicated refractive index pattern in cross-section, for example an annular region with a depressed refractive index in the cladding, the diameters of regions with different refractive indices can be maintained within the permitted tolerances. A device for this purpose is shown in FIG. 8 above the coating bath 850 and is denoted by the reference numeral 851.

As already shown in FIG. 4 another aspect of the inventive method of manufacturing a fibre is that the device 860 for determining the concentricity of the inner coating with respect to the core and the cladding is a device according to the invention.

A further aspect of the method according to the invention is that the core diameter and the concentricity are measured in a bath containing coating material through which the fibre is passed.

Figure 9:
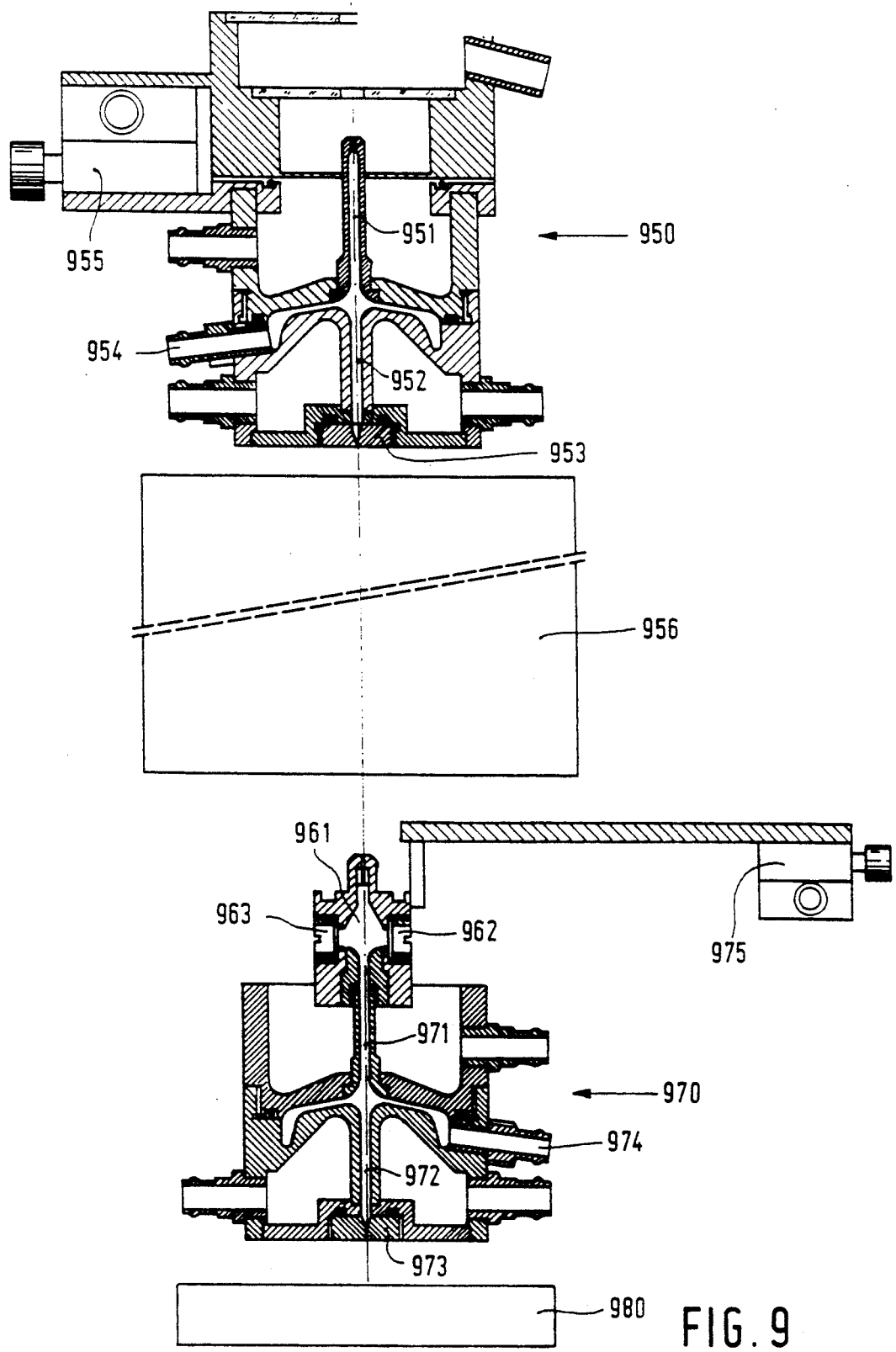

This is illustrated in FIG. 9 for measuring the concentricity. In this Figure two reservoirs 950 and 970 are shown one below the other for providing the inner and outer coatings, respectively. The device 956 for curing the inner coating is indicated between the two reservoirs. Each reservoir contains an inlet duct 951,971, a central duct 952, 972, respectively through which the fibre is passed and in which the fluid coating material is introduced via a supply 954 and 974 and it contains a nozzle 953 and 973, respectively, with an outlet opening through which the fibre leaves the reservoir. For further details about these tanks reference is made to the previously mentioned European Patent Application 0,200,256.

In FIG. 9 the lower tank has windows 962 and 963 through which the fibre can be observed by means of a measuring device (not shown) according to the invention. The windows 8962 and 963 are provided in a widened part 961 of the upwardly extended inlet duct 971. It has been found that a transparent, for example, glass tube can be used instead of the widened part 961 with the windows 962 and 963, which tube is placed on the inlet duct and whose inner and outer diameters are such that they cause only a negligible refraction. With the aid of a measuring device (not shown) as in FIG. 4 or FIG. 5, the concentricity of the inner coating with respect to the fibre is measured and the signal supplied by the measuring device is applied to the control mechanism 955 with which the position of the top of the upper tank 950 is adjusted with respect to the fibre. A slight movement of the inlet duct 951 with respect to the fibre is sufficient to correct a deviation in the concentricity. The lower reservoir 970 has a control mechanism 975 which is controlled by means of signals from a device 980 for measuring the concentricity of the outer coating with respect to the fibre. The device 980 may be conventional measuring device or a device according to the invention. In the later case the fluid for filling the measuring space is chosen with a view to its removal at a later stage and/or its influence on the fibre.

Although this is not shown in the Figure, it will be evident that the upper reservoir may also be provided with an extended inlet duct having a widened portion or with a transparent tube. A device according to the invention may be used for performing measurements on the uncoated fibre via windows in said portion.

FIG. 10 shows diagrammatically an optical single-mode fibre according to the invention which is obtained if use is made of the above-described measuring and control devices during manufacture. The length of the part shown is of the order of several kilometers and the total diameter is approximately $250/\mu m$. The diameters of the layers shown are mutually not to scale either. The core 1011 has a diameter of, for example $9/\mu m$ with a maximum deviation of $0.2/\mu m$. The core is surrounded by the cladding 1012 whose outer diameter has an average value of, for example $125/\mu m$, but in which the maximum deviation of the average value is considerably larger than this deviation at the core. The cladding is enclosed by an inner coating 1013 which is, for example, only $10/\mu m$ thick at an average and in which the eccentricity of this coating with respect to the fibre is less than $0.5/\mu m$. Such a small extent of eccentricity is rendered possible by using measuring devices according to the invention. Surrounding the inner coating the outer coating is provided with an average layer thickness of approximately $52/\mu m$. Due to the small variations in the core diameter such a fibre exhibits fewer losses in the transmitted radiation than the known single-mode fibres.

What is claimed is:

1. A device for the measurement of at least one diameter of an elongated object with a core and at least one transparent layer around said core, said device comprising means for defining a measuring space for accommodating the part of the object to be measured, at least one light source unit outside said measuring space and a light sensitive detection system for detecting light from the measuring space, an objective lens system disposed between the measuring space and the light sensitive detection system, said objective lens system having a limited acceptance angle such that light deflected by the interfaces between the core and transparent layers is not captured by the objective lens system, the objective system imaging the object as a pattern of dark and light bands representing the interface between the core and transparent layers of the object and the distances therebetween.

2. A device as claimed in claim 1, characterized in that it includes means to fill the measuring space with a transparent substance whose refractive index differs from the refractive index of the transparent outer layer of the object, said refractive index difference being at a maximum approximately equal to the radius of curvature of the outer side of the object divided by the distance between the plane and the objective system.

3. A device as claimed in claim 1 wherein the light source unit includes means to provide a light beam, which at the location of the object, has a cross-section which is larger than the part of the object to be measured.

4. A device as claimed in claim 3, wherein the light source includes means to provide that the light beam with which the object is illuminated is substantially parallel.

5. A device as claimed in claim 1, characterized in that the light source unit and the objective are placed on either side of the measuring space.

6. A device as claimed in claim 5, characterized in that the principal axis of the light beam and the optical axis of the objective system extend at an angle to each other.

7. A device as claimed in claim 1, characterized in that the objective system includes means to produces a magnified image of the said plane in the light-sensitive detection system.

8. A device as claimed in claim 1, characterized in that the objective system comprises a first sub-system having a first focal length and a second sub-system having a second focal length, the first sub-system being movable and the second sub-system being placed at a distance from the light-sensitive detection system, which distance is equal to the second focal length.

9. A device as claimed in claim 1, characterized in that it comprises a plurality of objective systems and an equal plurality of light-sensitive detection systems, the optical axes of the objective systems extending at an angle to one another.

10. A device as claimed in claim 1, wherein said means for defining a measuring space comprise a transparent cylindrical tube, said object being disposed within the opening of said transparent cylindrical tube.

* * * * *